(12) United States Patent
Klus

(10) Patent No.: US 6,648,965 B2
(45) Date of Patent: Nov. 18, 2003

(54) FIRE DOOR COMPONENTS AND FIRE DOORS COMPRISING THE COMPONENTS

(75) Inventor: Donald F. Klus, Tigard, OR (US)

(73) Assignee: G-P Gypsum Corporation, Atlanta, GA (US)

( * ) Notice: Subject to any disclaimer, the term of this patent is extended or adjusted under 35 U.S.C. 154(b) by 139 days.

(21) Appl. No.: 09/899,542

(22) Filed: Jul. 6, 2001

(65) Prior Publication Data

US 2003/0015124 A1 Jan. 23, 2003

(51) Int. Cl.$^7$ .............................................. G04B 11/00
(52) U.S. Cl. ................. 106/772; 106/774; 106/DIG. 2; 264/333; 428/920; 428/921; 156/39
(58) Field of Search ................................. 106/772, 774, 106/DIG. 2; 264/333; 428/920, 921; 156/39

(56) References Cited

U.S. PATENT DOCUMENTS

| | | | |
|---|---|---|---|
| 2,803,575 A | 8/1957 | Riddell et al. | |
| 4,159,302 A | 6/1979 | Greve et al. | |
| 4,343,127 A | 8/1982 | Greve et al. | |
| 4,748,771 A | 6/1988 | Lehnert et al. | |
| 5,391,245 A | 2/1995 | Turner | |
| 5,632,848 A | 5/1997 | Richards et al. | |
| 6,340,389 B1 | 1/2002 | Klus | |

FOREIGN PATENT DOCUMENTS

| | | |
|---|---|---|
| CN | 1059708 A | 3/1992 |
| JP | 49-001623 A2 | 1/1974 |
| JP | 52-043216 B4 | 10/1977 |
| JP | 9142952 A | 6/1997 |

*Primary Examiner*—Paul Marcantoni
(74) *Attorney, Agent, or Firm*—Banner & Witcoff, Ltd.

(57) ABSTRACT

Structural components for a fire door comprising a core and edge banding and other structural components, the components comprising gypsum, expanded perlite, and cement, and having a density between about 60 and 80 lbs./ft.$^3$. Also, a method by which the structural components are made and a fire door comprising the components.

20 Claims, 2 Drawing Sheets

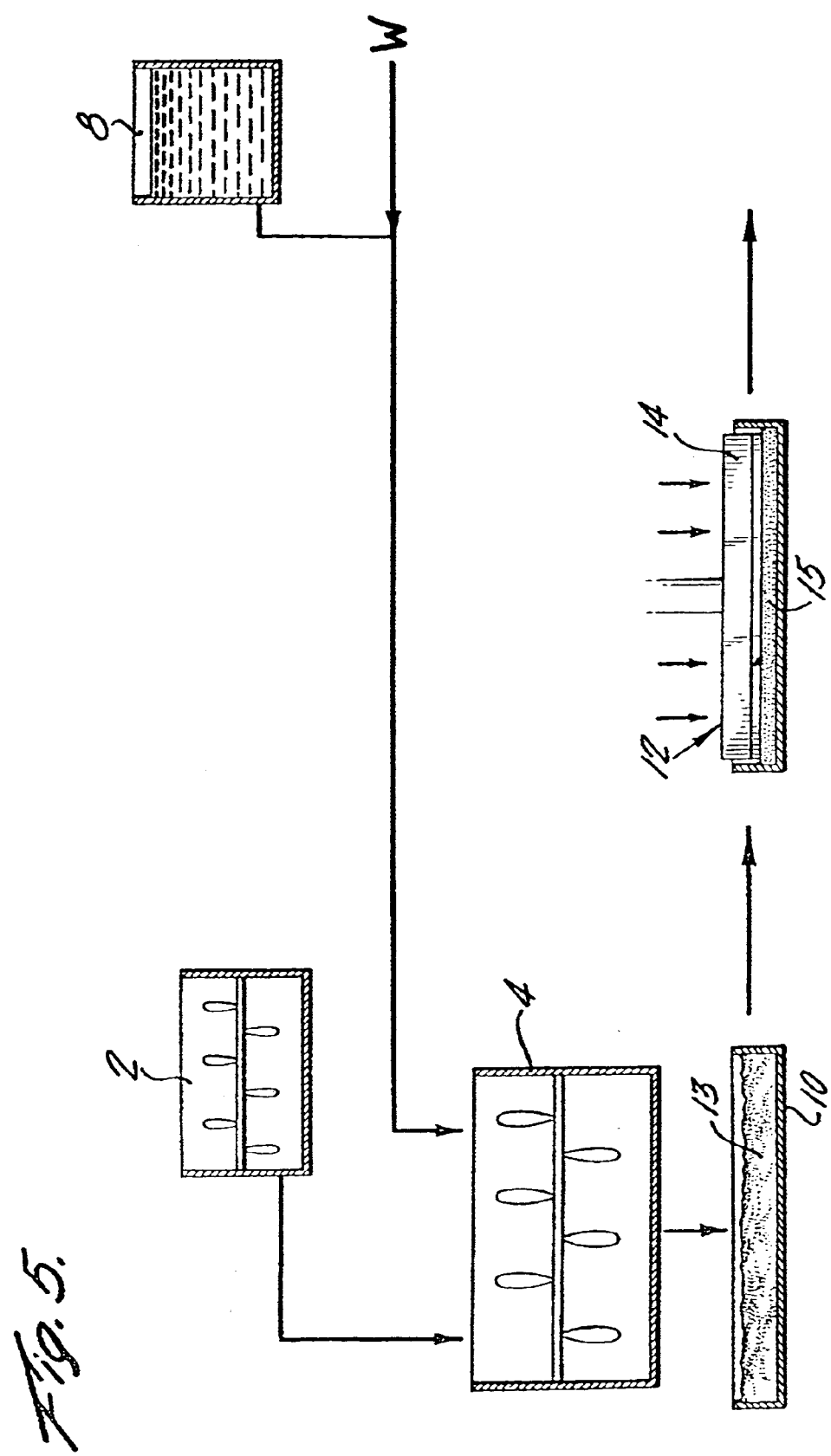

FIRE DOOR COMPONENTS AND FIRE DOORS COMPRISING THE COMPONENTS

FIELD OF THE INVENTION

This invention relates to structural components of fire doors. In particular, the invention relates to structural components, such as stiles, rails, and edge banding, formed of fire-resistant materials, to a method and to a dry mix for making these components, and to fire doors comprising these components. The structural components provide structural strength sufficient for attachment of fittings and hardware by use of standard carpentry techniques.

DESCRIPTION OF RELATED ART

The use of fire doors in buildings is an important factor in avoiding injuries and loss of lives and in preventing property damage as a result of their ability to deter the spread of fire. In the interest of public safety, standards have been set by governmental agencies, building code authorities, and insurance companies for the installation and performance of door assemblies that retard the passage or spread of fire. Building codes require that fire-resistant door assemblies be installed in wall openings and that such assemblies pass standard and industry-wide accepted tests that are an evaluation of the fire-resistant properties of the door assembly.

The fire door contemplated by the present invention is a composite structure comprising a manufactured fire-resistant core surrounded by an edge frame or banding, and, optionally, other features, and having veneer or other sheet surface coverings usually comprising either wood or plastic. Such a composite door must have certain basic properties in order to meet accepted standards and pass industry-wide accepted fire endurance tests of door assemblies in accordance with ASTM E-152. In these tests, the door is exposed to intense heat such as that generated by fire in a burning building. Exemplary conditions of such tests involve exposing the door to temperatures that progressively increase to values within the range of 1750° to 1800° F. for an exposure period up to 1½ hours.

Manufactured fire door cores are known in the art. Typical of such cores are those made of calcium silicate, often together with asbestos and Portland cement. As such cores have fallen from favor in view of the safety and environmental concerns related to the presence of asbestos, cores based on gypsum were developed. However, door cores comprising significant proportions of gypsum often have a relatively high density, thus yielding relatively heavy doors. U.S. Pat. No. 4,159,302 and U.S. Pat. No. 4,343,127 are directed to gypsum-containing cores that have reduced density yet satisfy fire code requirements.

Typically, cores are manufactured by introducing a mixture of materials in a moldable state into a mold. Skilled practitioners recognize that such moldable mixtures typically include water for hydration of components such as cements and gypsum, and may include additional water to make the mixture easier to transport as a fluid. Excess water must be removed after the desired shape has been achieved. Then, edge banding and similar features are attached after the core has been dried. The cores disclosed in U.S. Pat. Nos. 4,159,302 and 4,343,127 were manufactured with a minimum quantity of water, thus obviating the need to press water out of the mixture.

Edge banding often is used in doors having such manufactured cores because the core materials, whether made with a minimum quantity or excess quantity of water, do not exhibit the strength required to hold screws and other fasteners, and are not resistant to splitting. Such fasteners are necessary to attach hardware, such as hinges and other devices, to the door. Known banding typically is dense, and therefore adds significantly to the weight of the resultant door.

Thus, there exists a need for structural components for a fire door meeting the fire code requirements and also providing convenient and economical manufacture and simple and effective fitting and mounting of the doors by use of standard carpentry or other conventional tools.

There also exists a need for a composite door formed of a molded core and composite edge banding made up of a plurality of strips of fire-resistant materials, and having not only good fire-resistance and strength characteristics so as to reinforce the edges of the core and to meet conditions of use, such as door slamming, but also exceptional integrity and machineability.

SUMMARY OF THE INVENTION

The invention is directed to structural components for a fire door meeting fire code requirements, to a method for making such components, to a dry mix for making such components, and to the resultant fire-resistant door comprising the structural components. The structural components are formed from fire-resistant compositions that are press molded from moldable compositions. The components are less dense than known components, yet have screw-holding strength sufficient for attaching hardware and fittings to the door with conventional tools and techniques. Structural components of the invention have exceptional integrity and machineability.

The invention also is directed to a dry mix for making structural components of the invention, and to a method for manufacturing the structural components of the invention. In accordance with the method of the invention, the dry materials used to form the composition are moistened with a quantity of fluid, typically water, sufficient to provide that quantity of water necessary to satisfy the hydration requirements of the composition, and to provide a damp mixture sufficient to facilitate formation of the components during the molding process. Thus, the moldable composition is easily formed into the desired shapes and compression molded, yet has a green strength sufficient to enable transfers and handling of the components essentially immediately after being formed. The structural components also are easily incorporated into a fire door.

BRIEF DESCRIPTION OF THE DRAWINGS

FIG. 5 is a flow diagram of a process for manufacturing a fire door structural component of the kind contemplated for use in the fire door of the present invention.

DETAILED DESCRIPTION OF THE INVENTION

The invention is directed to structural components for assembling a fire door meeting fire code requirements, to a dry mix for making the structural components, to a method for making the structural components, and to the resultant fire-resistant door. The structural components are formed from press moldable mixtures of fire-resistant compositions. The press moldable mixture comprising a damp mixture of solids is transferred into a mold and compression molded to form a panel. The various structural components then are obtained from a panel by cutting appropriately sized pieces. Structural components made in this manner are less dense than known components, although more dense than typical fire door cores. The structural components exhibit mechanical strength, particularly screw-holding capacity and split resistance, sufficient to attach hardware and other fittings to the door by conventional techniques.

The inventor has discovered that compositions comprising materials selected in accordance with the guidelines set forth herein and made in accordance with the method of the invention can be press molded from a damp mixture of solids to form structural components having the required strength characteristics and properties. In accordance with the method of the invention, the dry ingredients of the composition are moistened with a quantity of water sufficient to provide the water necessary for hydration of the dry materials, together with that quantity of fluid sufficient to accommodate flow during the molding process. The inventor has discovered that, surprisingly, components thus molded have sufficient green strength to be handled and processed essentially immediately after removal from the mold, before drying, and produce final forms of sufficient strength to be used as the structural components in fire doors.

Whereas the invention is described with particularity herein as regarding fire-resistant doors, skilled practitioners recognize that the invention can be used to form fire-resistant panels for essentially any type of fire-resistant panel, requiring characteristics and properties found in the panels.

Door Structure

Figure 1:
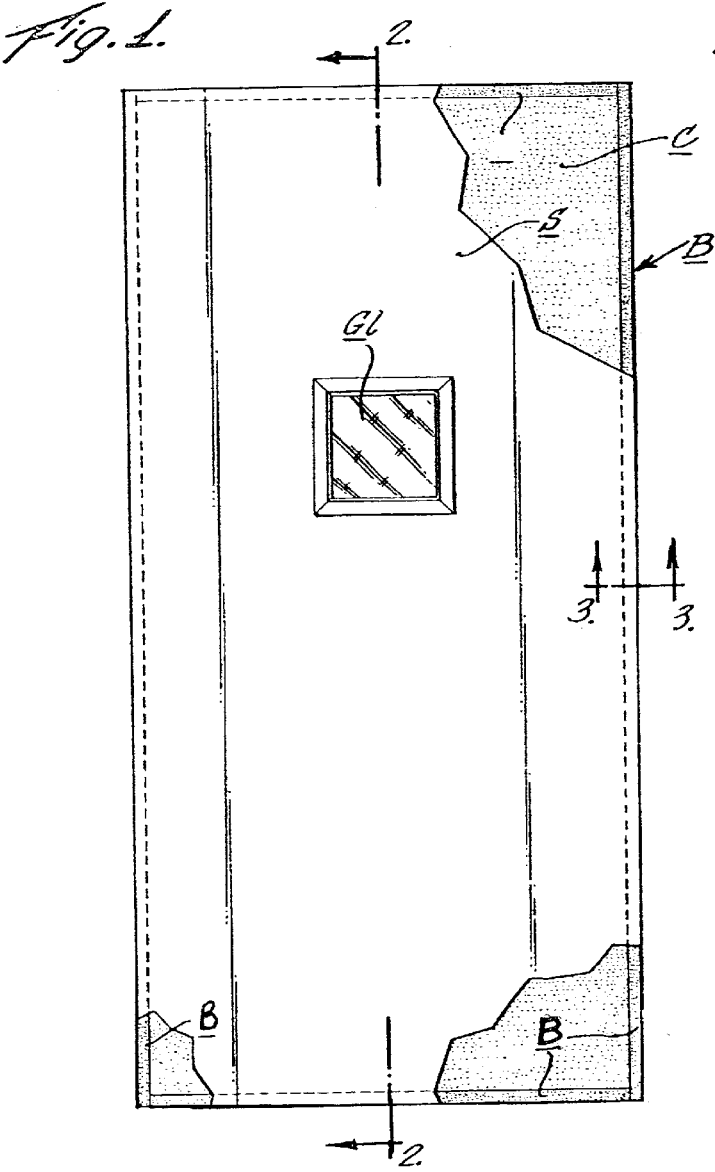
FIG. 1 is an elevational view of a fire door constructed according to the present invention, with certain corner portions broken out in order to show interior parts.
Figure 2:
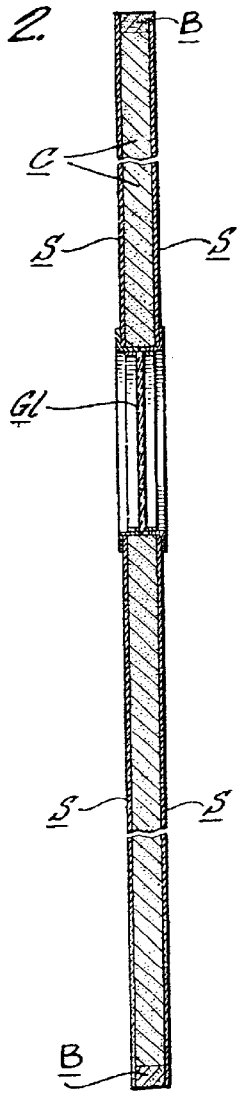
FIG. 2 is a vertical sectional view taken on the line 2—2 of FIG. 1.
Figure 3:
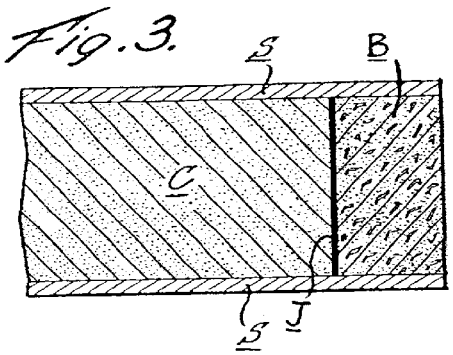
FIG. 3 is a horizontal fragmentary sectional view on an enlarged scale, taken as indicated by the section line 3—3 of FIG. 1.

A typical fire door constructed according to the present invention is illustrated in FIGS. 1 to 3. The door is made up of a core C and edge banding structural components, indicated generally by the letter B, surround to the edges of the core. Other structural components and features also may be present in the door. For example, the door may be provided with a glass panel or light as indicated at G1. Preferably, both sides of the door are covered with sheet material as indicated at S, in the form of wood veneer, a plastic layer, or any other suitable covering layer.

Each piece of the edge banding structural component B is formed in accordance with the method of the invention. Structural components of the invention also can be used around the opening for the glass, to provide additional structural integrity, and elsewhere in the core.

Suitable fire door cores may be manufactured in divers ways and the invention is not limited to any particular door core composition or construction. Structural components of the invention can be used with any available core. Cores formed from compositions that can be molded and then dried to form the core are preferred. Cores disclosed in U.S. Pat. Nos. 4,159,302 and 4,343,127 are particularly preferred for manufacture of a door having a core and structural components of the invention.

Structural components of the invention comprise gypsum, perlite, fibrous material, organic binder, and shrinkage reduction agent. Cement and cure accelerants also may be used, as may materials such as dyes and colorants.

The structural components comprise in major fraction set gypsum, that is, calcium sulfate dihydrate. The set gypsum is formed by the recrystallization of calcined gypsum with water. Calcined gypsum is in general produced by driving off water of hydration present in naturally-occurring gypsum (calcium sulfate dihydrate) through the use of heat. Depending on the degree of calcination, there is produced calcium sulfate hemihydrate ($CaSO_4 \cdot \frac{1}{2} H_2O$) or other form of calcium sulfate capable of hydrating with water to form set gypsum. The calcined gypsum is conveniently used in powdered form.

Components of the invention also comprise expanded perlite, which is a glass-like material. Speaking generally, expanded perlite can be formed by heating moisture-containing, naturally-occurring perlite ore at a temperature within the range of about 1500° to 2000° F. Such heat treatment explodes or expands the perlite to, for example, 15–20 times its original volume. Commercially available grades of expanded perlite known as cryogenic, plaster, and concrete aggregate are exemplary of materials that can be used.

Perlite fines are used in structural components of the invention. These fines typically have a bulk density of between about 2 and about 4 pounds per cubic foot. The fines typically have a particular size of 100-mesh, i.e., comprise that portion of expanded perlite having a particle size that passes through a 100-mesh screen. Particles as large as those that pass through a 50-mesh screen are suitably used in components of the invention.

The expanded perlite functions as a non-combustible, compactable filler which imparts light weight to the set composition, and also relatively high strength as compared to other means that could be used to impart light weight to the set composition (for example, such as by introducing air voids into the set composition by foaming the mixture of ingredients from which the set composition is made), but which would degrade other desirable characteristics and properties of the structural components of the invention.

Fibrous reinforcements impart flexibility and impact-resistant properties to the set composition, and also better handling properties in that resistance to cracking or breakage during shipment or processing is improved. Suitable fibrous reinforcements include glass fibers; wood (e.g., pulp and dry ground paper) fibers; sisal fibers; asbestos; and graphite and synthetic fibers, such as, for example, rayon, polyacrylonitrile, and polyolefin fibers. Preferred fibers are selected from the group consisting of glass fibers, wood fibers, polyolefin fibers and blends thereof.

Glass fibers may be selected from the many glass fibers commercially available. Preferably, glass fiber used in the invention is chopped to a length of about ½ inch. Such chopped fiber also is commercially available.

Wood fiber suitably used in the invention include wood pulp and dry paper. Pulp suitably used in the invention can be prepared either chemically or mechanically by known methods. Skilled practioners recognize that pulp typically is supplied in aqueous slurry having a solid concentration established to make the slurry conveniently pumpable. The quantity of water in a pulp slurry should, of course, be considered when determining the quantity, if any, of water to be added to the ingredients to form the damp mixture from which structural components of the invention are made. Wood-based papers, ground dry, also yield wood fiber suitable for use in the invention. Dry-ground newsprint is a preferred source of wood fiber. Suitable wood fiber is available from many sources.

Polyolefin fiber also is a preferred fiber. Suitable fiber is of the type now commonly used as a reinforcement in Portland cement, and is commercially available from many sources. Polyproplylene fiber is especially preferred. Two suitable polypropylene fibers are available from Fibermesh Corporation under the trade names "Stealth" and "Harborite." Preferably, polyolefin fiber is chopped to a length less than about ½-inch, more preferably about ¼-inch.

An organic binder also is used in the structural component of the present invention. Binder is an aid to achieving desired flexural and compressive strength and general handling characteristics. The organic binder can be a naturally-occurring material or a synthetic material. Examples of the former include starches, dextrins and gums. Examples of synthetic materials are resins such as polyvinyl alcohol, polyvinyl acetate, polymers of vinyl acetate and ethylene, styrene/butadiene polymers, and acrylic resins.

The organic binder typically is a material that is dispersible or soluble in water. The preferred organic binder is polyvinyl acetate, a well-known commercially available material.

Aqueous solutions of organic binder also can be used in the invention. The water in such a solution thus forms part of the water needed to form the damp mixture from which the structural components of the invention are formed. Thus, although a solution of essentially any concentration can be used, the quantity of water introduced by the solution must be considered, as this quantity, together with the quantity of water introduced with other ingredients (e.g., pulp), should not exceed the quantity required to form the damp mixture.

Suitable aqueous solutions of polyvinyl acetate are available from Specialty Polymers, Inc., under the tradenames "D-398" and "475." The former has a solids concentration of between about 45 and 49 weight percent; the solids concentration of the latter is between about 60 and 62 weight percent.

Shrinkage reduction agents serve to ameliorate shrinkage of structural components of the invention, particularly during exposure to fire. They also impart desirable characteristics to the structural components. Shrinkage reduction agents are selected from the group consisting of clay, diatomaceous earth, and blends thereof. Preferably, a blend of clay and diatomaceous earth is used.

The use of clay imparts to the set structural component improved fire-resistance and high temperature dimensional stability. Broadly speaking, clays are natural, earthy, fine-grained materials, most of which exhibit plastic characteristics when moistened with limited amounts of water. In general, clays comprise primarily alumina, silica, and water, and also may contain to a lesser extent iron, alkali, alkaline earth, and other metals. The various types of clays in general have particles ranging in size from fractions of a micron to about 40 microns, although some materials having particles of an even larger size are also considered clays. It should be understood that materials which do not have all of the above characteristics, but which nevertheless are generally referred to as clays because they have one or more of the above characteristics, are included within the term "clay" as used herein.

Examples of the types of clay that can be utilized are: bentonite—comprised mainly of the clay mineral montmorillonite; attapulgite—clays which contain magnesium aluminum silicates; and kaolinitic clays—including, for example, kaolin (also referred to as china or paper clays), ball clay, fireclay, and flint clay, which clays are comprised predominately of the clay mineral kaolinite. Other of the various types of clays that contain mixtures of various proportions of clay minerals, such as for example, illite, chlorite, kaolinite and montmorillonite, as well as non-clay materials, may also be used.

Preferred clays are those having a relatively fine particle size, i.e., less than 200 mesh. A preferred clay is available from RHI Refactories, Inc., under the tradename "Green Stripe," 200 mesh fine grind.

Diatomaceous earth improves heat-resistance, reduces shrinkage during exposure to fire, and lowers the density of the structural components of the invention. Diatomaceous earth is a known material available from a number of sources.

Accelerants also may be suitably included in the composition. For example, ground hydrated calcium sulfate is used as an accelerant to speed setting time of the hydrated ingredients.

Another ingredient optionally used in the structural components as an accelerant is hydraulic cement, a material that reacts with water to form a hydrated product. Various types of hydraulic cements can be used, including those occurring in nature. Examples of hydraulic cements include Portland cement, cements containing a high content of aluminates and characterized by their rapid hardening properties, pozzolanic cement, cements characterized by their high content of calcium silicates, and cement from deposits in the Lehigh Valley, Pa. Mixtures of different cements can be used also. Portland cement is readily available and excellent results have been achieved using this relatively inexpensive cement. It is preferred that the structural components be prepared from Type III Portland cement.

The set hydraulic cement also imparts to the structural component good water-resistant properties, particularly during exposure to fire and enhances compressive strength. Accordingly, the set hydraulic cement also aids greatly in maintaining the integrity of the structural component when it is exposed to the wetting and the pressure of a fire hose stream. In addition, the set hydraulic cement also functions as shrink-resistant material in the structural component when it is exposed to fire.

Dry solid aluminum sulfate, or a solution thereof, also can be used as an accelerant.

The composition from which components of the invention are formed comprises the set product of an aqueous mixture, based on the total weight of the dry ingredients in the mixture, of:

(A) about 60 to about 80 wt. % of calcined gypsum;

(B) about 3 to about 12 wt. % of expanded perlite fines;

(C) about 1.5 to about 7.5 wt. % of fibrous material;

(D) about 4 to about 10 wt. % of an organic binder; and (E) about 3 to about 18 wt. % of shrinkage reduction agent.

Preferably, the composition comprises, on a dry basis:

(A) about 60 to about 75 wt. % of calcined gypsum;

(B) about 3 to about 10 wt. % of expanded perlite fines;

(C) about 1.5 to about 6 wt. % of fibrous material;

(D) about 4 to about 8 wt %. of organic binder;

(E) about 3 to about 15 wt %. of shrinkage reduction agent; and (F) about 2.5 to about 12.5 wt. % of accelerants.

Fibrous materials include glass fiber, about 0.3 to about 1.0 wt. %, preferably about 0.5 to about 0.7 wt. %; pulp, about 1.0 to about 4.0 wt. %, preferably about 1.2 to about 3.5 wt %; dry paper, about 2.5 to about 7.5 wt. %, preferably about 3.0–5.5 wt. %; and polyolefin fiber, about 3.0 to about 7.5 wt. %, preferably about 4.0 to about 6.5 wt. %. Only one fiber type need be present.

Shrinkage reducing agents include about 3 to about 12 wt. %, preferably about 3.5 to about 10 wt. %, diatomaceous earth and about 3 to about 8 wt. %, preferably about 3.5 to about 7.5 wt. %, clay. Preferably, clay and diatomaceous earth are used together.

Preferably, accelerant includes about 2.5 to about 6 wt. % ground hydrated gypsum and about 6 to about 10 wt. % cement.

Dry mix of the invention comprises the same ingredients as are used to form the structural components of the invention. The ingredients of the dry mix are in dry form. Thus, dry fibrous material is appropriately used. Further, organic binder in dry form should be used. Pulp and aqueous solutions of organic binder are not appropriately used in preparation of dry mix of the invention.

Thus, dry mix of the invention comprises the same dry ingredients in the same proportion as the composition from which components of the invention are formed. Thus, dry mix of the invention comprises (A) about 60 to about 80 wt. % of calcined gypsum;
(B) about 3 to about 12 wt. % of expanded perlite fines;
(C) about 1.5 to about 7.5 wt. % of fibrous material;
(D) about 4 to about 10 wt. % of an organic binder; and
(E) about 3 to about 18 wt. % of shrinkage reduction agent.

Preferably, the composition comprises, on a dry basis:

(A) about 60 to about 75 wt. % of calcined gypsum;
(B) about 3 to about 10 wt. % of expanded perlite fines;
(C) about 1.5 to about 6 wt. % of fibrous material;
(D) about 4 to about 8 wt %. of organic binder;
(E) about 3 to about 15 wt %. of shrinkage reduction agent; and
(F) about 2.5 to about 12.5 wt. % of accelerants.

Further, the relative proportions of the various fibrous materials, shrinkage reducing agents, and accelerants remain the same.

The damp mixture from which the set structural component is made contains water in an amount at least sufficient to provide the stoichiometric amount of water needed to cause setting of the calcined gypsum and hydraulic cement. It is generally expedient to include a small amount of water in excess of the stoichiometric amount. For ease of manufacture, it is preferred that the amount of water be no greater than that needed to provide a damp mixture of the ingredients. If a sufficient quantity of water is present in the ingredients, e.g., with pulp and organic binder, it may not be necessary to add water separately. The set structural component can be prepared readily from a damp mixture having about 25 to about 60% of water based on the weight of the dry ingredients comprising the mixture.

Structural components within the scope of the present invention can be prepared having a screw pull strength of at least about 650 pounds and a split resistance of at least about 700 pounds. Furthermore, structural components that are relatively light in weight can be produced. For example, structural components having a density within the range of about 60 to about 80 lbs./cu. ft. and having required fire-resistant properties can be manufactured. It should be understood that set compositions of greater density also are suitably used as structural components.

To form structural components of the invention, the ingredients can be combined in any order. Preferably, the dry ingredients are mixed, and then water and aqueous ingredients, i.e., those in the form of an aqueous slurry, such as pulp, or an aqueous solution, such as organic binder, are added. If the quantity of water in the aqueous ingredients is sufficient to form the damp mixture, no additional water need be added. Thorough mixing of the ingredients typically is accomplished in a paddle type mixer by mixing for about 25 to about 40 seconds.

When using the dry mix of the invention, all the solid ingredients are present in dry form. Thus, the dry mix need only be mixed, typically for between about 25 and about 40 seconds, with a quantity of water sufficient to form the damp mixture.

After the ingredients are mixed thoroughly, the damp mixture is transferred to an open-top mold having a shape corresponding to that desired for the structural component being made. The damp mixture then is compression molded to compact the mixture to the desired density and thickness or to a thickness somewhat greater than desired. Pressures within the range of about 300 to about 350 psi for about 15 to about 25 seconds are sufficient. During this compression, essentially no water is pressed out of the composition.

One of the important characteristics of the present invention is that immediately after the damp mixture has been compressed, its green strength is such that it is shape-retaining and can be conveyed or transferred to a door assembly station or to a drier without breaking. Although the inventors do not wish to be bound by theory, it is believed that the green strength of the structural component is due to partial setting of the calcined gypsum and compression of the mixture.

Typically, the structural components are cut or otherwise separated from a larger sheet formed in accordance with the method of the invention. However, as skilled practitioners recognize, the material from which structural components of the invention can be formed into any practical shape.

Preferably, structural components of the invention are placed 'green' into desired locations of a mold for a fire door. Then, core material is transferred into the mold and processed as necessary, most preferably by drying, to yield a complete fire door ready for finishing (such as sanding and cladding with veneer). Thus, the structural components are dried together with the core.

However, if desired, drying of the structural component can be accomplished separately at room temperature, or accelerated by the use of heat. Such heating can be accomplished by placing the structural component in an oven having a temperature within the range of about 150° to about 350° F. for a time sufficient to achieve the desired degree of dryness. Typically, the period ranges from about 3 to about 4 hours. It should be understood that the time during which the structural component remains in the heated environment depends on the temperature thereof.

Following the preferred method, it is possible to prepare a finished door within a relatively short period.

After the components or the complete door has been dried, finishing operations can be effected. For example, the complete door can be sanded to a thickness within the required tolerance, sawed, or shaped as desired. The nature of the dried material is such that finishing operations can be performed readily.

A specific example of a method for preparing structural components and a fire door useable in the door of the present invention is described below in connection with FIG. 5.

Dry materials in desired proportion are mixed thoroughly in mixer 2 to form a dry mixture. This dry mixture then is fed to mixer 4, into which any aqueous slurries or solutions from container 8 and any necessary water W are fed. All of the ingredients are mixed thoroughly in mixer 4. The water required to set the calcined gypsum and hydraulic cement is available from the aqueous dispersion or solution of the organic binder. After the ingredients are thoroughly mixed, the resultant damp mixture 13 is fed to mold 10. Mold 10 then is transferred to pressing station 12 where mixture 13 is compressed by press member 14 into the desired shape and density and to a thickness approximating and at least as thick as that desired.

Promptly after the mixture has been compressed, the formed structural component 15 is removed from the mold and transferred for further processing, i.e., either size reduction or drying, neither of which is shown in FIG. 5. The transfer period affords a short time at ambient temperature to allow for hydration of the calcined gypsum and hydraulic cement. As mentioned above, one of the important characteristics of the freshly compressed structural component is that it has a sufficiently high green strength to permit it to be handled in the manner described without damage.

Figure 4:
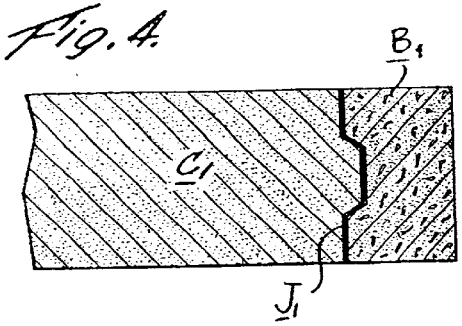
FIG. 4 is a view similar to FIG. 3 but illustrating an alternative embodiment.

Manufacture of fire doors comprising structural components of the invention can be carried out in any manner known to skilled practitioners. For example, a core can be prepared separately from the structural components of the invention, and then combined with structural components to form a door. In accordance with these methods, the structural components will be attached to the core in any suitable manner. For example, as illustrated in FIGS. 3 and 4, adhesive can be used in Joint J between core C and structural component B. Similarly, a core and structural components can be nailed, screwed, bolted, or otherwise attached to each other.

Preferably, however, core C is formed from a material that can be poured into a mold in which structural components of the invention have been placed. In this manner, the core and the structural components become adhered to each other at joint J without the need for adhesive or other compositions. In particular, cores formed in accordance with the disclosures of U.S. Pat. No. 4,159,302 or U.S. Pat. No. 4,343,127 are such preferred cores. Further, when the core material requires drying, it is especially advantageous to form a door in the preferred manner, as it affords the opportunity to dry the structural components of the invention together with the core and form a unitary fire door quickly and efficiently, and without requiring additional processing and materials to form a fire door.

To form a door in accordance in the preferred manner, structural components of the invention are placed into a mold to form an edge banding, rails, stiles, or any other structural features, as desired. Then, core material is introduced into the mold and pressed or otherwise processed to form a unitary door structure. The door then is further processed, e.g., by drying, sanding, or cutting, as required to form a door of desired dimension. Veneer or other sheet covering material can be added thereafter.

Although door cores may be made up of a single piece, it is to be understood that, if desired, the core may be made up or assembled from several pieces which may either have flat abutting edge surfaces or be provided with tongue and groove interengaging surfaces so that they may be assembled in interlocking relationship. If multiple pieces are employed for assembling the core, the use of veneer or other sheet material adhesively applied at the faces of the door may serve to unify the structure.

One of the important characteristics of the structural components, and particularly of the edge banding, is the screw-holding strength. Screw-holding strength is of particular importance because hinge butts for the door hinges are customarily screwed into the edges of the banding. The presence of fibers in the edge banding is important in contributing screw-holding strength. The wood and paper fibers also help to reduce the density and make the composition more machineable.

The presence of fibers is important to maintenance of the integrity of the edge banding and other structural components during fire and hose stream testing.

The composition of the structural component is of significance in establishing screw-holding strength adequate to meet the demands of securing hinges and latch plates capable of withstanding normal use. Structural components formulated in the manner described and claimed herein will have a screw-holding strength of at least about 650 lbs., and it is preferred that the screw-holding strength be at least about 700 lbs. This value may be determined by a simple screw-holding test accomplished by drilling a 5/32" pilot hole in a strip of the component measuring 1 inch by 1½ inches. A number 12 sheet metal screw then is inserted in the pilot hole and the screw is pulled to failure, and the screw-holding capacity measured as the value of the pull in pounds at the point of failure.

Split resistance also is an important characteristic of edge banding and other structural components. Split resistance is measured in accordance with the following procedure. A 5/32" diameter hole is drilled into a 1 inch by 1½ inch piece of component. Then, a punch having a taper of 1/32", such as that manufactured by Stanley Tools, #58-111, is forced into the hole. The force required to drive the punch a distance of sufficient to cause the piece to split is measured.

It should be noted that the door assembly provided in accordance with the practice of the present invention meets the conditions required for acceptance as a fire door, such as those referred to hereinabove. In addition, the employment of structural components in accordance with the invention in combination with the core formed of materials as described, including gypsum, is particularly fire resistant while affording special advantages in connection with carpentry working required in the mounting of the doors and attachment of other fixtures.

EXAMPLES

The following examples are representative of the claimed invention, and are not to be considered limiting in any way.

Structural components of the invention were formed in accordance with the method described herein. The dry ingredients were blended together in the mass proportions set forth in Table 1 below. The dry ingredients were gypsum, perlite fines, shrinkage reduction agent(s), and accelerants (s). The dry fibrous materials were glass, dry paper, and polypropylene fibers.

The dry mixture then was combined with the wet ingredients and, where appropriate, additional water. The wet ingredients were the organic binder solutions and the pulp. The resultant damp mixture was introduced into a mold and compressed at a pressure of 350 psi for 15 seconds to form green structural components of the invention. The components were dried in a conventional drier at a temperature of 350° F. for 4 hours. The density of each of the components was determined, as set forth in the table below.

Test strips 1 inch by 1½ inch were cut from the molded structural components. The Screw Holding and Split Resistance tests were carried out as described in the specification. The Split Resistance test was not carried out for Examples 4, 9, and 10. The results of the tests are set forth in Table 1 below. The legend "NS" appended to most of the Split Resistance test results indicates that the component did not split, i.e., remained intact, at the value reported.

Gypsum used in the Examples was from plural commercially-available sources. The perlite fines had a density of about 3 lb/ft$^3$ and a particle size of less than 100 mesh.

The glass fibers had been chopped to a length of about ½ inch. The pulp was an aqueous slurry of ordinary wood pulp having a solids content of about 6%. The dry paper was newsprint and other papers ground dry. "Stealth" is the polypropylene fiber material available from Fibermesh Corporation as identified in the specification, and was chopped to a length of about ¼ inch.

The organic binders were the polyvinyl acetate products "475" and "D398" available from Specialty Polymers, Inc., as described in the specification. The clay was "Green Stripe" from RHI Refractories, as described in the specification, and the cement was Type III Portland cement.

As can be seen from the results set forth in Table 1, structural components that had Screw Holding and Split Resistance test results that met or exceeded values that reflect suitability for resin commercially serviceable doors at densities typically less than 75 lbs/ft$^3$.

TABLE I

| Ingredient, wt % | 1 | 2 | 3 | 4 | 5 | 6 | 7 | 8 | 9 | 10 | 11 |
|---|---|---|---|---|---|---|---|---|---|---|---|
| Gypsum | 53.9 | 52.2 | 61.2 | 49.7 | 61.2 | 61.2 | 66.0 | 43.9 | 51.4 | 63.2 | 63.2 |
| Perlite Fines | 6.8 | 6.5 | 7.7 | 3.3 | 7.7 | 7.7 | 7.7 | 5.5 | 6.5 | 7.9 | 7.9 |
| Fibrous Materials | | | | | | | | | | | |
| Glass | 0.4 | 0.4 | 0.5 | 0.5 | 0.5 | 0.5 | 0.5 | 0.3 | | | |
| Pulp | 20.3 | 19.6 | | 19.0 | | | | 34.3 | 23.1 | | |
| Dry Paper | | | 2.9 | | 2.9 | 2.9 | 2.9 | | | 5.0 | |
| Stealth | | | | | | | | | | | 5.0 |
| Organic Binder | | | | | | | | | | | |
| 475 | 9.3 | 9.0 | 10.5 | | 10.5 | | 10.5 | 7.6 | 8.3 | 10.9 | 10.9 |
| D398 | | | | 8.8 | | 10.5 | | | | | |
| Shrink Reduction Agent | | | | | | | | | | | |
| Diatomaceous Earth | 3.4 | 3.3 | 3.8 | 6.6 | 3.8 | 3.8 | 3.8 | 2.8 | 3.6 | 4.0 | 4.0 |
| Clay | | 3.3 | 4.8 | 3.3 | 4.8 | 4.8 | 4.8 | 2.8 | 4.7 | 5.0 | 5.0 |
| Accelerant | | | | | | | | | | | |
| Cement | 5.9 | 5.7 | 8.6 | 5.9 | 8.6 | 8.6 | | | | | |
| Ground Hydrated Gypsum | | | | 2.9 | | | 3.8 | 2.8 | 2.4 | 4.0 | 4.0 |
| Water, wt % of Ingredients | | | 28.7 | | 28.7 | 28.7 | 28.7 | | | 29.7 | 29.7 |
| Density, lb/ft$^3$ | 71.3 | 73.8 | 73.1 | 70.8 | 77.8 | 76.2 | 75.6 | 71.4 | 75.3 | 71.2 | 67.3 |
| Screw Holding, pounds | 650 | 650 | 700 | 650 | 700 | 675 | 700 | 725 | 700 | 850 | 800 |
| Split Resistance, pounds | 1000NS | 1000NS | 1000NS | | 1100NS | 1050 | 1000NS | 1100 | | | 600NS |

I claim:

1. A structural component of a fire door comprising the press-molded set product of an aqueous mixture comprising:
   a) based on the total weight of dry ingredients,
      1) about 60 to about 80 wt. % of calcined gypsum;
      2) about 3 to about 12 wt. % of expanded perlite fines;
      3) about 1.5 to about 7.5 wt. % of fibrous material;
      4) about 4 to about 10 wt. % of an organic binder; and
      5) about 3 to about 18 wt. % of shrinkage reduction agent; and
   b) water in a quantity sufficient to form a damp mixture.

2. A dry mix for manufacturing a structural component of a fire door, said mix comprising, based on the total weight of dry ingredients,
   a) about 60 to about 80 wt. % of calcined gypsum;
   b) about 3 to about 12 wt. % of expanded perlite fine;
   c) about 1.5 to about 7.5 wt. % of fibrous material;
   d) about 4 to about 10 wt. % of an organic binder; and
   e) about 3 to about 18 wt. % of shrinkage reduction agent.

3. A method for manufacturing a fire door comprising:
   a) press molding a damp mixture comprising,
      (1) based on the total weight of the dry ingredients,
         i) about 60 to about 80 wt. % of calcined gypsum;
         ii) about 3 to about 12 wt. % of expanded perlite fines;
         iii) about 1.5 to about 7.5 wt. % of fibrous material;
         iv) about 4 to about 10 wt. % of an organic binder; and
         v) about 3 to about 18 wt. % of shrinkage reduction agent; and
      (2) water in a quantity sufficient to form the damp mixture, to form structural components having a green strength sufficient to be shape-retaining;
   (b) placing structural components into desired locations of a mold for a fire door; and
   (c) introducing fire door core material into the mold to form a fire door.

4. The structural component of claim 1 comprising:
   a) based on the total weight of dry ingredients,
      1) about 60 to about 75 wt. % of calcined gypsum;
      2) about 3 to about 10 wt. % of expanded perlite fines;
      3) about 1.5 to about 6.0 wt. % of fibrous material;
      4) about 4 to about 8 wt. % of an organic binder;
      5) about 3 to about 15 wt. % of shrinkage reduction agent; and
      6) about 2.5 to about 12.5 wt. % of accelerants; and
   b) water in a quantity sufficient to form a damp mixture.

5. The method of claim 3, wherein the damp mixture comprises:
   (1) based on the total weight of the dry ingredients,
      i) about 60 to about 75 wt. % of calcined gypsum;
      ii) about 3 to about 10 wt. % of expanded perlite fines;
      iii) about 1.5 to about 6.0 wt. % of fibrous material;
      iv) about 4 to about 8 wt. % of an organic binder; and
      vi) about 2.5 to about 12.5 wt. % of accelerants; and
   (2) water in a quantity sufficient to form the damp mixture to form structural components having a green strength sufficient to be shape-retaining;
   (b) placing structural components into desired locations of a mold for a fire door; and
   (c) introducing fire door core material into the mold to form a fire door.

6. The structural component of claim 1, wherein the fibrous material is selected from the group consisting of between about 0.3 and about 1.0 wt. % glass fiber, between about 2.5 and about 7.5 wt. % dry paper, between about 3.0 and about 7.5 wt. % polyolefin fiber, and blends thereof.

7. The dry mix of claim 2, wherein the fibrous material is selected from the group consisting of between about 0.3 and about 1.0 wt. % glass fiber, between about 2.5 and about 7.5 wt. % dry paper, between about 3.0 and about 7.5 wt. % polyolefin fiber, and blends thereof.

8. The method of claim 3, wherein the fibrous material is selected from the group consisting of between about 0.3 and about 1.0 wt. % glass fiber, between about 1.0 and about 4.0 wt. % pulp, between about 2.5 and about 7.5 wt. % dry paper, between about 3.0 and about 7.5 wt. % polyolefin fiber, and blends thereof.

9. The structural component of claim 4, wherein the fibrous material is selected from the group consisting of between about 0.5 and about 0.7 wt. % glass fiber, between about 1.2 and about 3.5 wt. % pulp, between about 3.0 and about 5.5 wt. % dry paper, between about 4.0 and about 6.5 wt. % polyolefin fiber, and blends thereof.

10. The structural component of claim 6, wherein the fibrous material is selected from the group consisting of between about 0.5 and about 0.7 wt. % glass fiber, between about 1.2 and about 3.5 wt. % pulp, between 3.0 and about 5.5 wt. % dry paper, between about 4.0 and about 6.5 wt. % polyolefin fiber, and blends thereof.

11. The structural component of claim 1, wherein the shrinkage reduction agent is selected from the group consisting of between about 3 and about 12 wt. % diatomaceous earth, between about 3 and about 8 wt. % clay, and blends thereof.

12. The dry mix of claim 2, wherein the shrinkage reduction agent is selected from the group consisting of between about 3 and about 12 wt. % diatomaceous earth, between about 3 and about 8 wt. % clay, and blends thereof.

13. The method of claim 3, wherein the shrinkage reduction agent is selected from the group consisting of between about 13 and about 12 wt. % diatomaceous earth, between about 3 and about 8 wt. % clay, and blends thereof.

14. The structural component of claim 4, wherein the shrinkage reduction agent is selected from the group consisting of between about 3.5 and about 10 wt. % diatomaceous earth, between about 3.5 and about 7.5 wt. % clay, and blends thereof.

15. The method of claim 6, wherein the shrinkage reduction agent is selected from the group consisting of between about 3.5 and about 10 wt. % diatomaceous earth, between about 3.5 and about 7.5 wt. % clay, and blends thereof.

16. The structural component of claim 4, wherein the accelerant is selected from the group consisting of between about 2.5 and about 6 wt. % ground hydrated gypsum, between about 6 and about 10 wt. % cement, and blends thereof.

17. The dry mix of claim 5, wherein the accelerant is selected from the group consisting of between about 2.5 and about 6 wt. % ground hydrated gypsum, between about 6 and about 10 wt. % cement, and blends thereof.

18. The method of claim 6, wherein the accelerant is selected from the group consisting of between about 2.5 and about 6 wt. % ground hydrated gypsum, between about 6 and about 10 wt. % cement, and blends thereof.

19. The structural component of claim 1, wherein the structural component has a screw pull strength of at least about 650 pounds and a split resistance of at least about 700 pounds.

20. The structural component of claim 1, wherein the density of the component is between about 60 and about 80 lbs./ft.$^3$.

* * * * *